Figure 1:
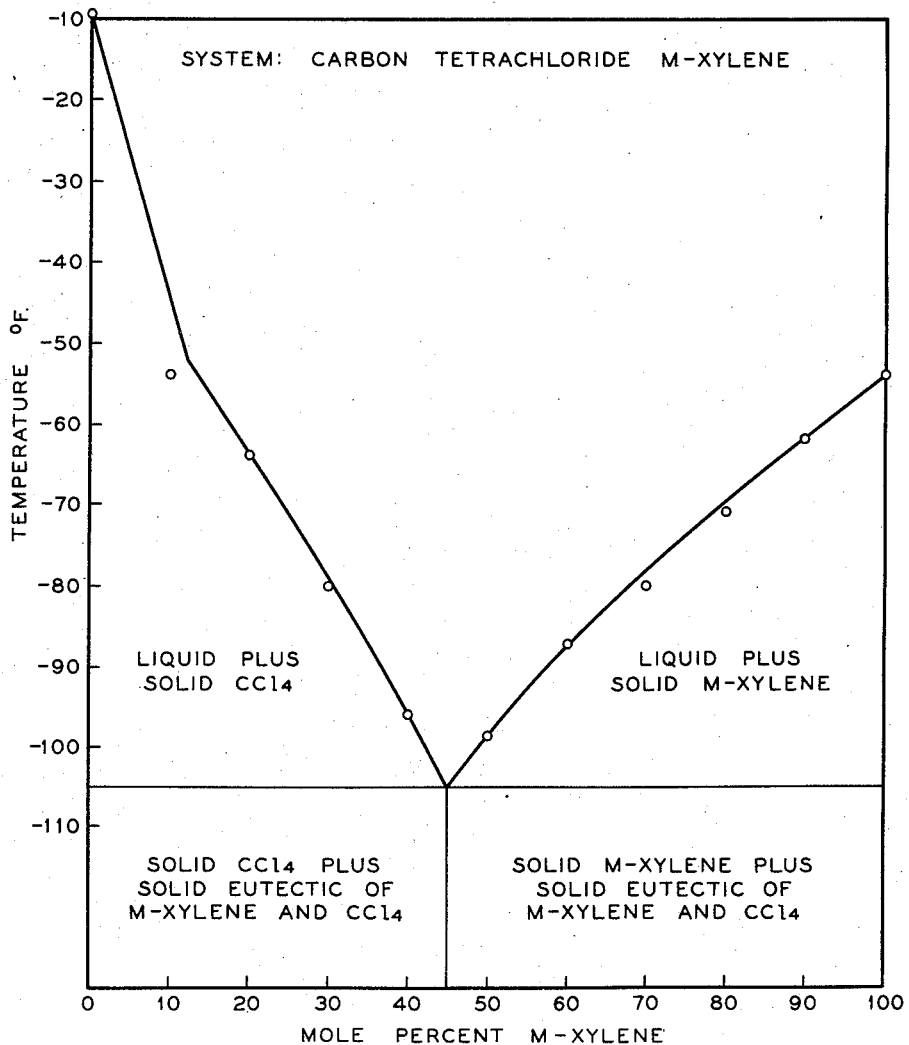

Oct. 7, 1958  R. V. LUTHY  2,855,444
SEPARATION PROCESS

Filed Oct. 4, 1952  6 Sheets-Sheet 5

INVENTOR
RAYMOND V. LUTHY
BY *A. L. Snow*
*Frank E. Johnston*
ATTORNEYS

United States Patent Office 2,855,444
Patented Oct. 7, 1958

2,855,444
SEPARATION PROCESS

Raymond V. Luthy, Berkeley, Calif., assignor to California Research Corporation, San Francisco, Calif., a corporation of Delaware Application October 4, 1952, Serial No. 313,158

32 Claims. (Cl. 260—674)

This invention relates to a process of separating polymethyl benzene hydrocarbons from mixtures of hydrocarbons containing such compounds.

This application is a continuation-in-part of copending application, Serial No. 102,877, filed July 2, 1949, and now abandoned.

Ordinarily, components of liquid mixtures are separated by fractional distillation. In such cases, however, there must be sufficient difference in the boiling points of the components to permit separation by distillation. When fractional distillation does not produce the desired separation of liquid mixtures, fractional crystallization is often employed. In order to fractionally crystallize and thus separate components of a mixture, there must be sufficient difference in the crystallizing temperature of the components to make such a process feasible. In addition, the components of the mixture should not form a solid eutectic that makes separation by fractional crystallization of the components of the mixture impossible.

It is an object of this invention to provide a method of separating benzene hydrocarbons having no substituents other than methyl groups and having at least one pair of methyl groups in para-relationship from a mixture of said compounds with other hydrocarbon compounds.

It is another object of this invention to provide a process of separating a mixture of isomers of methyl-substituted benzene hydrocarbons having at least one para-dimethyl isomer present in the mixture.

It is a further object of this invention to provide a continuous process of separating a benzene compound having no substituents other than methyl groups and having at least one pair of methyl groups in para-relationship from normally liquid hydrocarbon mixtures containing said compound.

These and still further objects of this invention will be readily apparent from the following detailed description.

It has been discovered that a polymethyl benzene hydrocarbon having no substituents other than methyl groups and having at least one pair of methyl groups in para-relationship can be separated from mixtures of that compound with its position isomers or from hydrocarbon mixtures containing said compound and other hydrocarbon compounds including at least one position isomer of said polymethyl benzene by a process comprising adding tetrahalogenated methane having a molecular weight at least equal to carbon tetrachloride to the liquid hydrocarbon, cooling the resultant mixture to a temperature sufficient to form a solid phase containing the polymethyl benzene hydrocarbon having at least one pair of methyl groups in para-relationship and tetrahalogenated methane and a mother-liquor phase containing said other hydrocarbon compounds including the position isomers and tetrahalogenated methane and separating these phases.

Table I, below, shows the results of a number of experiments in which mixtures of hydrocarbons and tetrahalogenated methanes are cooled to separate a solid phase and a liquid phase. The table is set up with "yes" indicating formation of an addition or molecular compound of the hydrocarbon and tetrahalogenated methane, and "no" indicating that no molecular compound was formed. Melting points of the molecular compounds are shown.

TABLE I
*Tetrahalogenated methane*

| Compounds Tried | $CFCl_3$ | $CCl_4$ | $CBrCl_3$ | $CBr_2Cl_2$ | $CBr_4$ |
|---|---|---|---|---|---|
| p-Xylene | No | Yes, 25° F | Yes, 45° F | Yes, 73° F | Yes, 128° F. |
| m-Xylene | | No | No | | |
| o-Xylene | | No | No | | |
| Styrene | | No | | | No. |
| Ethylbenzene | | No | | | |
| p-Bromotoluene | | No | | | |
| p-Cresol | | No | | | |
| 1-Ethyl, 2,5-dimethyl benzene | | No | | | No. |
| Mesitylene | | No | | | |
| Hemimellitene | | No | | | |
| p-Tertiarybutyl toluene | | No | | | No. |
| Pseudocumene | | Yes, −47° F | Yes, −44° F | Yes | Yes, +64° F. |
| Durene | | No | No | Yes, 120° F | Yes, 183° F. |
| Isodurene | | | | No | Yes, 41° F. |
| Pentamethylbenzene | | | | | Yes, 50° F. |
| Cyclohexane | | No | | | No. |
| Biphenyl | | No | | | |
| Naphthalene | | No | | | No. |

From the foregoing table it can be seen that compounds not having a benzene ring or having more than one benzene ring in the compound do not form molecular compounds with tetrahalogenated methanes; for example, cyclohexane, biphenyl, and naphthalene. Likewise, it is evident that compounds containing substituents other than methyl groups did not form molecular compounds with tetrahalogenated methane, for example, ethylbenzene, styrene, p-tertiarybutyltoluene, p-bromotoluene and p-cresol. Further, it can be seen from this table that polymethyl benzene hydrocarbons not having a pair of methyl groups in para-relationship did not form a molecular compound with tetrahalogenated methanes, for example, mesitylene, o- and m-xylene, and hemimellitene.

The tetrahalogenated methanes entering into molecular compound formation have molecular weights at least equal to that of carbon tetrachloride.

It was also discovered that, because dibromodichloromethane forms a molecular compound with durene but not with isodurene, durene can be separated from isodurene by adding dibromodichloromethane to a mixture containing durene and isodurene, cooling the mixture and dibromodichloromethane to form a solid phase containing durene and dibromodichloromethane and a mother-liquor phase containing isodurene, and separating said phases.

When a liquid hydrocarbon feed stock containing a polymethyl benzene hydrocarbon having no substituents other than methyl groups and having at least one pair of methyl groups in para-relationship is mixed with tetrahalogenated methane and then the mixture is cooled, a molecular compound forms in which the mole ratio of the polymethyl benzene hydrocarbon to tetrahalogenated methane is 1:1. Table II, which follows, lists properties of representative molecular compounds produced pursuant to this invention.

TABLE II

| Molecular Compound | Melting Point, °F. | Molecular Weight | Heat of Fusion, Cal./mole | Density, g./cc. |
| --- | --- | --- | --- | --- |
| Carbon tetrachloride-p-xylene. | 25 | 260 | 6,620 | 1.37 at 19° F. |
| Bromotrichloromethane-p-xylene. | 45 | 304 | | |
| Tribromochloromethane-p-xylene. | 73 | 349 | | |
| Carbon tetrabromide-p-xylene. | 128 | 438 | | |
| Carbon tetrachloride-pseudocumene. | −47 | 274 | 5,450 | |
| Dibromodichloromethane-durene. | 120 | 377 | 8,780 | 1.677 at 68° F. |

When a mixture of a polymethyl benzene having at least one pair of methyl groups in para-relationship and carbon tetrachloride or a heavier tetrahalogenated methane is cooled to the point where solid formation occurs and when the temperature of the first solid formation is plotted against the hydrocarbon content of the mixtures, curves are obtained which show a maximum in temperature composition relationship which is typical of compound formation in binary systems. This maximum corresponds to a compound in which one mole of hydrocarbon and one mole of tetrahalogenated methane are present.

Figure 2:
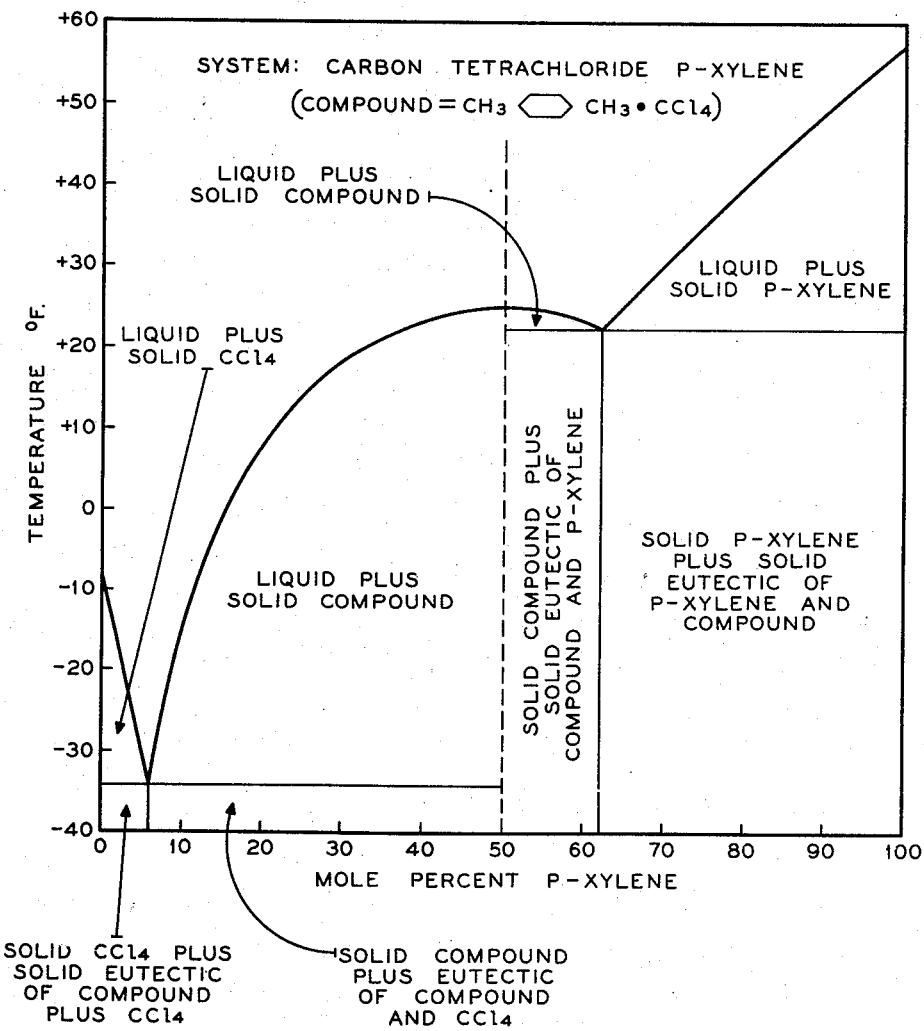
Figure 3:
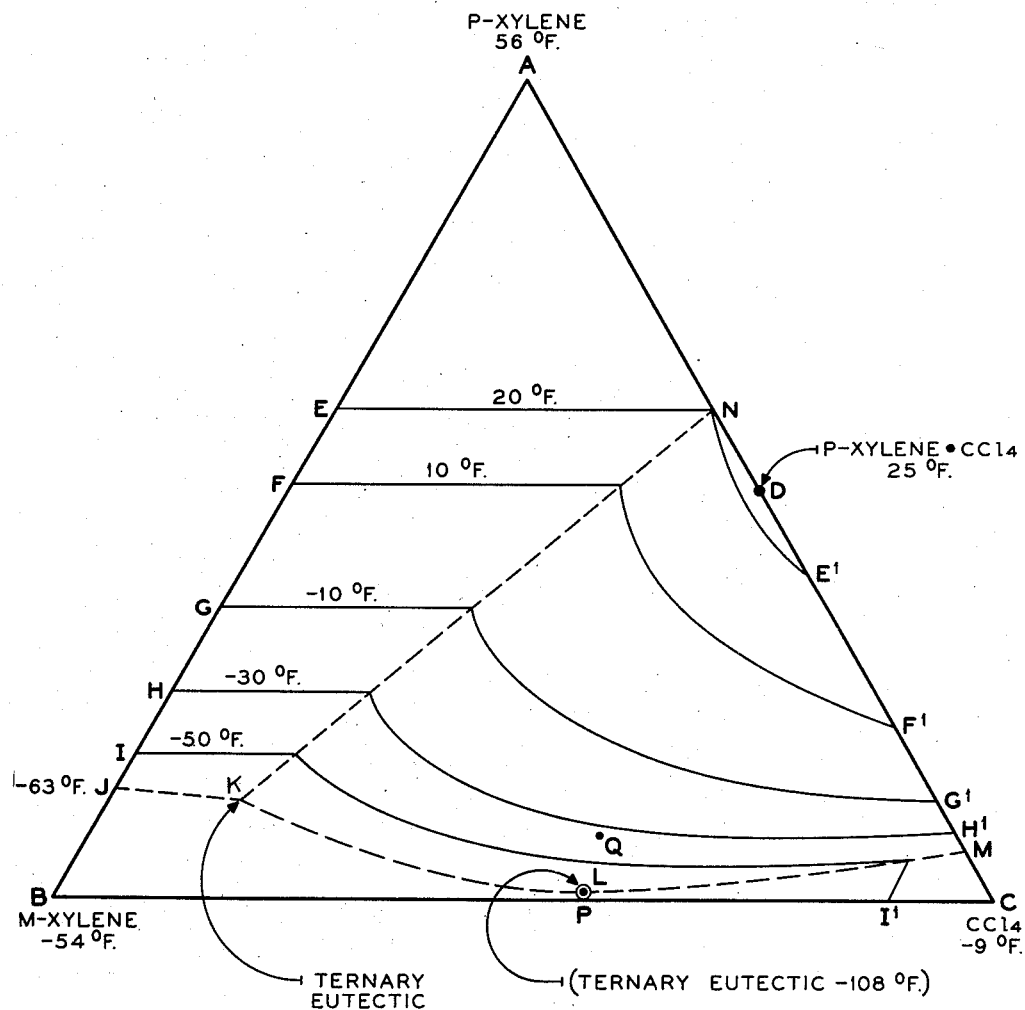
Figure 4:
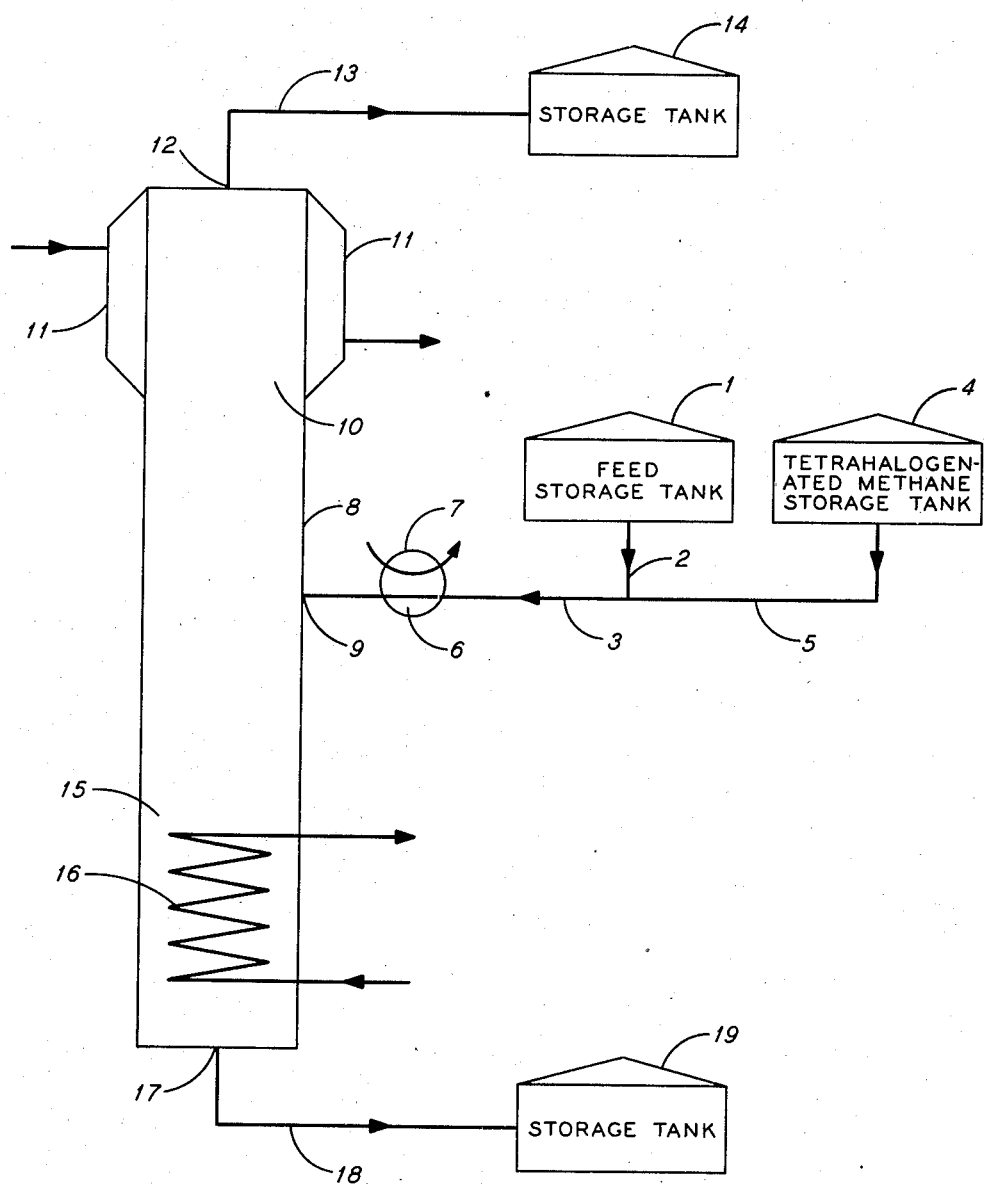
Figure 5:
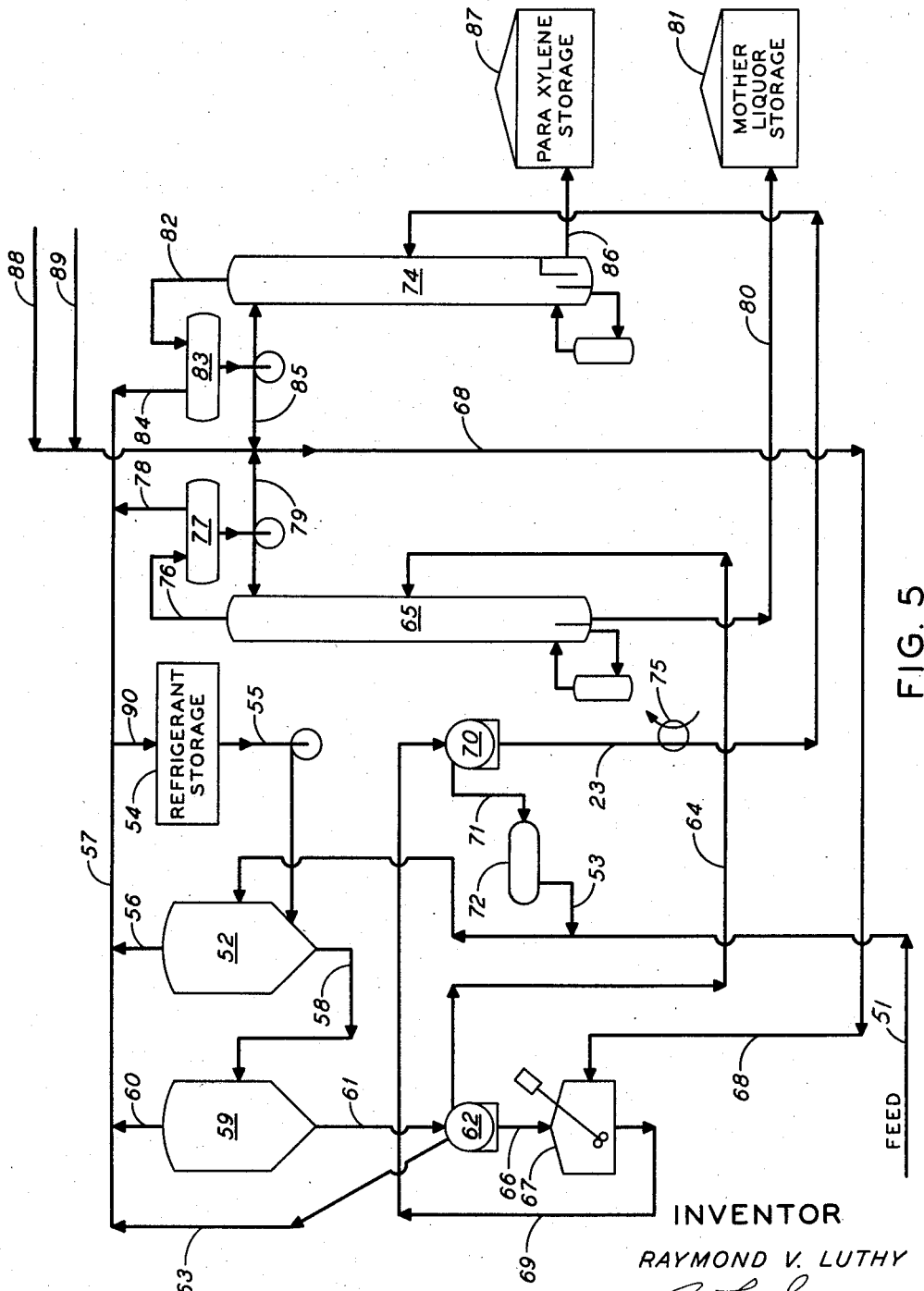

The invention will be further understood by reference to the drawings in which Figures 1 to 3 comprise phase diagrams of systems pertinent to the invention, Figures 4 and 5 are schematic representations in elevation of apparatus in which the invention can be practiced, and Figures 6 to 10 are graphical representations of recoveries obtained pursuant to the invention.

Figures 1 and 2 illustrate the types of temperature-composition curves obtained when mixtures of varying amounts of tetrahalogenated methane with polymethyl benzenes which do and which do not form molecular compounds with the tetrahalogenated methane are cooled to the temperature of first solid formation. Figure 1 describes the system carbontetrachloride-m-xylene in which no molecular compound is formed. Figure 2 describes the system carbon tetrachloride-p-xylene in which a solid molecular compound is formed.

The addition compound of para-xylene and carbon tetrabromide has a sufficiently high melting point to permit ready study of its X-ray diffraction properties. X-ray diffraction data are summarized in the following Table III, in which "D" values are interplanar distances measured in Angstrom units and "I" values are intensities of lines in arbitrary units ranging from 0, corresponding to the vanishing point, to 10, indicating very strong intensity.

TABLE III

| Carbon Tetrabromide | | Para-xylene | | Molecular Compound, Para-xylene-Carbon tetrabromide | |
| --- | --- | --- | --- | --- | --- |
| D | I | D | I | D | I |
| | | 5.5 | 5 | 8.8 | 2 |
| | | 4.8 | 4 | 5.8 | 2 |
| 5.0 | 3 | 3.76 | 1.5 | 5.0 | 5 |
| 3.9 | 0 | 3.35 | 1 | 4.21 | 1 |
| 3.8 | 0 | 2.98 | 1 | 3.92 | 1 |
| 3.43 | 0 | 2.88 | 2 | 3.43 | 1 |
| 3.19 | 1 | 2.80 | 1 | 3.18 | 1 |
| 3.02 | 3 | | | 3.01 | 5 |
| 2.87 | 1 | | | 2.87 | 1 |
| 2.83 | 1 | | | 2.83 | 0 |
| 2.78 | 1 | | | 2.75 | 2 |
| 2.68 | 0 | | | 2.66 | 1 |
| 2.55 | 0 | | | 2.55 | 1 |
| 1.96 | 0 | | | 2.43 | 1 |
| 1.72 | 0 | | | 2.38 | 1 |
| | | | | 1.98 | 0 |
| | | | | 1.96 | 1 |
| | | | | 1.90 | 1 |

These data show that the X-ray diffraction lines for this addition compound 8.8, 5.8, 2.43 and 2.38 are not found in either carbon tetrabromide or in para-xylene. These lattice spacings ("D" values) cannot be accounted for as arising from either of the components and their presence is a conclusive indication of the existence of a molecular compound. These addition compounds correspond to the formula:

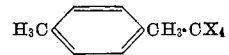

in which each X is either chlorine, bromine, or iodine.

Tetrahalogenated methane compounds suitable for use in the process of this invention are carbon tetraiodide, carbon tetrabromide, carbon tetrachloride, and tetrahalogenated methanes containing different halogens such as bromotrichloromethane, dibromodichloromethane, and tribromochloromethane.

Figure 3 is a triangular phase diagram for m-xylene-p-xylene-carbon tetrachloride mixtures. Each apex of the triangular graph represents a component of a ternary system comprising p-xylene, m-xylene and carbon tetrachloride. The diagram is on a mole basis. The equimolar compound between p-xylene and carbon tetrachloride is shown on the right side of the triangle at D.

The triangular diagram can be divided into four different parts depending on the composition of the solid phase that first forms when a given solution is cooled. The four areas are included between the lines joining the following letters: AJKN, NKLM, MLPC, and BJKLP. For example, if a solution whose composition is represented by a point in the area AJKN is cooled, the solid phase that crystallizes first is p-xylene. Similarly, in the areas NKLM, MLPC and BJKLP, the solid phases that crystallize first are, respectively, the compound p-xylene.CCl$_4$, carbon tetrachloride, and m-xylene. Inside the triangular diagram these areas are separated by dotted lines representing the composition of binary eutectic mixtures as follows: Line JK represents the binary eutectic between m-xylene and p-xylene; line KN represents the binary eutectic between the compound p-xylene·CCl$_4$ and p-xylene; line KL represents the binary eutectic between m-xylene and the compound p-xylene·CCl$_4$; line LM represents the binary eutectic between the compound p-xylene·CCl$_4$ and carbon tetrachloride; line PL represents the binary eutectic between m-xylene and carbon tetrachloride. There is a ternary eutectic at K for m-xylene, p-xylene and the compound p-xylene·CCl₄. Point L is another ternary eutectic for p-xylene·CCl₄, m-xylene and carbon tetrachloride.

The compositions of solutions that start to crystallize at the same temperature are connected by lines called isotherms and include lines EE', FF', GG', HH' and II'.

The advantage of this invention can be seen readily from the triangular diagram. For example, in recovering p-xylene by starting with a solution containing 17% p-xylene and 83% m-xylene, corresponding to point I on the left side of the triangle, p-xylene starts to crystallize from the solution at −50° F. and may be separated as pure p-xylene until the temperature reaches −63° F. at point J, corresponding to 13% p-xylene in the mother-liquor. Further cooling would cause separation of both p-xylene and m-xylene in the eutectic ratio. In the process of this invention, one would add carbon tetrachloride until the composition of the solution changed from point I to point Q, for example, corresponding to approximately 55 mole percent carbon tetrachloride. When this solution is cooled, the first phase that crystallizes is the compound p-xylene·CCl₄ at about −35° F. Further cooling will cause additional amounts of the compound p-xylene·CCl₄ to form. The composition of the mother-liquor changes from point Q in a direction opposite from point D toward point L. The cooling is stopped just above −108° F. at which temperature there is about 1% p-xylene present in the mother-liquor. On a carbon tetrachloride free basis this is equivalent to about 2.3% p-xylene. This is to be compared with 13% in the mother-liquor when no carbon tetrachloride is added.

The enhanced recovery is due to the low p-xylene content at the ternary eutectic of p-xylene·CCl₄, m-xylene and carbon tetrachloride, as compared to the binary eutectic of p-xylene and m-xylene.

The process of this invention may be conducted as a batch or continuous process. The continuous process may be carried out by employing continuous centrifuges, columns, or other similar means known to the art.

In the flow pattern illustrated by Figure 4, a feed stock, for example, containing p-xylene held in feed storage tank 1 is withdrawn through line 2 and passes into line 3. A tetrahalogenated methane is withdrawn from tetrahalogenated-methane storage tank 4 through line 5 and passes into line 3, where it mixes with the feed. The mixture in line 3 passes through cooling zone 6, wherein the mixture is cooled to almost its crystallization temperature by cooling coil 7.

The cooled mixture enters insulated separation zone 8 through line 3 at an intermediate point 9 of zone 8. The cooled mixture passes upward and is further cooled in upper portion 10 of zone 8 which is cooled by circulating a refrigerant through jacket 11. This cooling causes separation of a solid phase and a mother-liquor phase. The upper portion of zone 8 is maintained at a reduced temperature sufficient to form a solid phase containing p-xylene and tetrahalogenated methane.

The mother-liquor phase passes out of zone 8 through mother-liquor outlet 12, and then through line 13 into storage tank 14.

The solid phase (para-xylene·CCl₄) is more dense than either the mother-liquor phase or the feed stock containing tetrahalogenated methane and settles to the bottom of zone 8. As this phase settles, it cools incoming feed and tetrahalogenated methane from inlet 9. As the solid phase settles to the bottom of zone 8, it is melted in lower portion 15 of separation zone 8 by a heating coil 16 maintained at an elevated temperature sufficient to melt the solid. A portion of the melted solid phase is withdrawn through melted-phase outlet 17 and passes through line 18 into storage tank 19.

While the solid phase may be withdrawn alternatively as a slurry from the lower portion of zone 8 and then centrifuged to separate the solid phase from the mother-liquor phase, melting the solid phase in the lower portion 15 of zone 8 permits convenient recovery of a product of high purity. When the solid phase is melted in this lower portion 15, the resultant liquid communicates with incoming feed in the upper part of separation zone 8. Ordinarily, the concentration of p-xylene in the liquid resident in zone 8 at any time ranges from about 50 mole percent at the bottom of zone 8 (the remaining 50 mole percent being almost entirely carbon tetrachloride) to less than 1 mole percent at mother-liquor outlet 12 of zone 8.

EXAMPLE 1

An alternative flow pattern and arrangement of apparatus is illustrated in Figure 5. A feed which is characteristically a xylene fraction having a rather narrow boiling range and containing in practical operations 5 to 25% by volume of para-xylene is passed through line 51 into crystallization zone 52. Carbon tetrachloride enters line 51 through line 53 and passes into crystallization zone 52 with the feed. A refrigerant, such as liquid carbon dioxide, liquid ethane, and the like, is passed from refrigerant storage tank 54 through line 55 into crystallization zone 52. The mixture of feed and carbon tetrachloride in crystallization zone 52 is cooled by evaporation of the refrigerant. The evaporated refrigerant passes from crystallization zone 52 through line 56 into refrigerant manifold line 57. A slurry of the solid addition compound of para-xylene and carbon tetrachloride in the unsolidified portion of the feed and carbon tetrachloride is withdrawn from crystallization zone 52 at a temperature of −70 to −90° F. through line 58 and passed into second stage crystallization zone 59. The second crystallization zone 59 is maintained at a subatmospheric pressure, for example, at 2 to 5 p. s. i. a., to facilitate further evaporation of the refrigerant, causing further cooling of the slurry. The evaporated refrigerant passes from crystallization zone 59 through line 60 into refrigerant manifold line 57. A slurry of the solid addition compound of para-xylene and carbon tetrachloride in the unsolidified portion of the feed and carbon tetrachloride is withdrawn from crystallization zone 59 through line 61 and passed into filter 62 which is preferably a centrifugal filter. The slurry contains some unevaporated refrigerant which vaporizes during centrifuging and is passed from centrifugal filter 62 through line 63 into refrigerant manifold line 57. Centrifugal filter 62 separates the slurry into a mother-liquor which is passed through line 64 into distillation column 65 and a filter cake consisting of the solid addition compound of para-xylene and carbon tetrachloride. The filter cake contains an appreciable amount of entrained mother-liquor which is not removed from it during centrifugal filtration. The filter cake is passed from centrifugal filter 62 through line 66 into reslurrying zone 67. Carbon tetrachloride recovered from the process produced as described hereinafter is introduced into reslurrying tank 67 through line 68. The filter cake and carbon tetrachloride are mixed together in reslurrying tank 67. Reslurrying tank 67 is maintained at a somewhat higher temperature than the temperature of second stage crystallization zone 59, for example, at a temperature of −50 to −60° F. A portion of the filter cake is melted during the reslurrying step and the entrained mother-liquid is diluted or replaced by carbon tetrachloride. The slurry of filter cake and carbon tetrachloride which is produced in reslurrying tank 67 is withdrawn through line 69 and passed into a second centrifugal filter 70. Centrifugal filter 70 separates a filter cake consisting essentially of the solid addition compound of para-xylene and carbon tetrachloride which contains some entrained carbon tetrachloride, and the liquid phase of the slurry which consists predominantly of carbon tetrachloride, but which contains 2 to 4% of para-xylene produced by partial melting of the first filter cake in reslurrying zone 67 and the greater part of the mother-liquor which had been entrained in the filter cake produced at filter 62. This liquid phase is passed from centrifugal filter 70 through line 71 into surge drum 72, from which it is withdrawn through line 53 and passed into line 51 for return to crystallization zone 52. The filter cake produced at centrifugal filter 70 is withdrawn through line 73 and passed into distillation column 74. Line 73 carries the filter cake through heat exchanger 75 where it is melted.

The mother-liquor separated at centrifugal filter 62 is fractionally distilled in column 65 to separate carbon tetrachloride from the hydrocarbon components. Carbon tetrachloride withdrawn overhead passes through line 76 into reflux drum 77. Traces of refrigerant are withdrawn from reflux drum 77 through line 78 and passed into refrigerant manifold line 57. Carbon tetrachloride is withdrawn from refluxing drum 77; part of it is returned to column 65 as reflux, and the remainder is passed through line 79 into line 68 through which it passes to reslurrying tank 67. The hydrocarbon components of the mother-liquor are withdrawn from column 65 and passed through line 80 to mother-liquor storage tank 81.

In distillation column 74 the filter cake separated at centrifugal filter 70 is fractionally distilled to separate carbon tetrachloride and para-xylene. Carbon tetrachloride is removed overhead through line 82 and passed into reflux drum 83. Traces of refrigerant are removed from reflux drum 83 through line 84 and passed into refrigerant manifold line 57. A part of the carbon tetrachloride in reflux drum 83 is returned to column 74 as reflux and the remainder is passed through line 85 into line 68 through which it flows to reslurrying vessel 67. A para-xylene product is withdrawn from the bottom of column 74 through line 86 and passed into para-xylene storage tank 87. Makeup carbon tetrachloride is introduced into line 68 through line 88 as required. A small amount of methanol is introduced into line 68 through line 89. The methanol is introduced at a rate sufficient to maintain from about .01 to about .5% by volume based on the feed in the system. The methanol prevents plugging of filter screens and the fabric of centrifuge cages by the accumulation of micro-solids in the apertures of the fabric. The refrigerant gathered in manifold line 57 is passed through line 90 to refrigerant storage tank 54. The refrigerant gathered in line 57 is compressed and liquefied by appropriate means not shown.

The hydrocarbon bottoms products separated in columns 65 and 74 contain only traces of carbon tetrachloride. If the presence of these traces cannot be tolerated in the use situation proposed for the hydrocarbons, the traces can be removed by contacting the hydrocarbons containing traces of carbon tetrachloride and a small amount of water with metallic iron at about 400° F. Such contact results in the decomposition of the carbon tetrachloride and formation of ferric chloride in the contact vessel.

Semi-commercial scale tests of the process of the invention were made by employing apparatus and process flow conforming substantially to that shown in the drawing. The feed contained 17.2% para-xylene, 47.4% meta-xylene, 10.7% ortho-xylene, 12.5% non-aromatic hydrocarbons boiling within the boiling range of the xylenes, and 12.2% ethylbenzene.

A mixture of 500 gallons of the feed above described and carbon tetrachloride amounting to 50 mole percent of the hydrocarbon feed was processed. A final crystallization temperature of −98° F. was obtained using liquid carbon dioxide as the refrigerant. The mother-liquor produced at the crystallizers had a para-xylene content of 3% on a carbon tetrachloride-free basis. The para-xylene product recovered after reslurrying with carbon tetrachloride and distilling as shown in the drawing had a para-xylene content of 97.2%.

EXAMPLE 2

500 gallons of the xylene feed above described and carbon tetrachloride amounting to 25 mole percent of the hydrocarbon feed were processed in the manner described in the drawing, employing liquid carbon dioxide as the refrigerant. The final crystallization temperature was −102° F. The mother-liquor had a para-xylene content of 5% on a carbon tetrachloride-free basis. The para-xylene recovered after reslurrying with carbon tetrachloride and distilling in the manner described in connection with the drawing had a purity of 95.9%.

EXAMPLE 3

A 100 cc. sample of a 270–300° F. fraction of a catalytically-reformed naphtha obtained from a second-pass operation of a catalytic reformer wherein the feed to the second pass is a 275–300° F. cut of the first pass product, inspection of which follows in Table IV, and 30 cc. of carbon tetrachloride were poured into a Dewar flask containing a 1¼ inch diameter, 100–150 mesh fritted-glass disk which divided the flask into a lower and upper chamber. The lower chamber was connected by valved lines to a source of cooled gas and to a vacuum pump. While the reformed naphtha and carbon tetrachloride were being poured into the upper chamber, a small flow of cooled gas was maintained through the fritted disk to prevent this mixture from entering the lower chamber of the flask. The cooled gas stream was continued while the mixture was cooled by the addition of solid carbon dioxide to the reformed naphtha and carbon tetrachloride. A solid phase was formed by this cooling step. The temperature was lowered below the initial crystallization point in order to obtain maximum solid formation. The cooling temperature was not permitted to drop to a temperature at which a solid eutectic composition would form. After the solid phase had formed in the mixture and the temperature had been reduced sufficiently, the flow of cooled gas was discontinued and the vacuum pump was started. The unsolidified material, or mother-liquor, in the upper chamber was withdrawn through the fritted disk into the lower chamber of the Dewar flask and thereby separated from the solid phase in the upper chamber. The mother-liquor was then removed from the lower chamber of the flask. The solid phase in the upper chamber was melted and the vacuum pump was started again and the melted solid phase withdrawn into the lower chamber of the flask and recovered as a product. After the p-xylene had been separated from the feed stock, it left a mother-liquor having a low p-xylene content. Thereafter, m-xylene was separated from the carbon tetrachloride-free mother-liquor by a further cooling step. The carbon tetrachloride was separated from the mother-liquor by distillation to form a carbon tetrachloride-free mother-liquor. A 42.5 cc. sample of carbon tetrachloride-free mother-liquor was then cooled as in the p-xylene-separation step in the Dewar flask to solidify m-xylene.

Inspection of the feed stock, process data and analysis of the materials recovered in the process steps are given below in Table IV. The term "hydrocarbon" used in the following tables is intended to include the product of the process step concerned on a tetrahalogenated methane-free basis.

TABLE IV

| Inspection of feed stock: | Volume percent |
|---|---|
| o-Xylene | 9.3 |
| m-Xylene | 51.3 |
| p-Xylene | 16.1 |
| Ethylbenzene | 13.1 |
| Non-aromatics | 10.2 |
| Total | 100.0 |
| Boiling range, °F. | 270–300 |
| Initial crystallization temp., °F. | −53 |

Process data: Volume (cc.)
  Feed _____ 100
  Carbon tetrachloride _____ 30
  Mother liquor—
    Hydrocarbon _____ 68.5
    Carbon tetrachloride _____ 13.7
  Melted solid phase—
    Hydrocarbon _____ 25.5
    Carbon tetrachloride _____ 10
  Temperature, °F.—
    Initial crystallization _____ −47
    Filtration _____ −105
  Ratio—
    Mole ratio of p-xylene in feed stock to
      carbon tetrachloride _____ 1:2.4

Compositions (CCl₄-free bases):
  Mother liquor phase— Volume percent
    o-Xylene _____ 15.3
    m-Xylene _____ 55.7
    p-Xylene _____ 1.7
    Ethyl benzene _____ 14.4
    Non-aromatics _____ 12.9
      Total _____ 100.0

Solid phase (final melt)—
    p-Xylene, vol. percent _____ 49

Recovery: Volume percent
  Liquid _____ 91
  Hydrocarbon _____ 94
  p-Xylene _____ 85 m-Xylene separation:
  Feed (cc.) _____ ¹42.5
  Crystallization temp., °F. _____ −92
  Filtration temp., °F. _____ −108
  Crystals (melted—cc.) _____ 9
  Mother-liquor phase (cc.) _____ 30

Composition—
  Melted crystals: Volume percent
    o-Xylene _____ 7.5
    m-Xylene _____ 81.3
    p-Xylene _____ 0.7
    Ethylbenzene _____ 4.5
    Non-aromatics _____ 6.0
      Total _____ 100.0

Mother-liquor phase—
    o-Xylene _____ 17.3
    m-Xylene _____ 46.5
    p-Xylene _____ 4.1
    Ethylbenzene _____ 15.3
    Non-aromatics _____ 16.8
      Total _____ 100.0

Recovery:
  Liquid _____ 92
  m-Xylene _____ 90

¹ Of the p-xylene separation mother-liquor (CCl₄-free).

It will be noted that the mother-liquor obtained after separation of the addition compound of carbon tetrachloride and para-xylene by filtration contained approximately 2 percent by volume of para-xylene on a carbon tetrachloride-free basis. The mother-liquor from the para-xylene separation by direct crystallization without the employment of a tetrahalogenated methane contains 8–10% by volume of para-xylene.

EXAMPLE 4

The separation of this example was conducted similarly to that of Example 1, except: (1) the mixture of catalytically reformed naphtha and carbon tetrachloride was cooled by partially immersing the Dewar flask in liquid nitrogen; (2) the carbon tetrachloride to p-xylene ratio was increased; (3) the solid phase was partially melted to separate entrained mother-liquor before the final melting step; and (4) the solid phase was washed twice with carbon tetrachloride before the final melting step.

The process data and analysis of the materials formed in the process steps are recorded in Table V, which follows:

TABLE V

Process data: Volume (cc.)
  Feed _____ 173
  Carbon tetrachloride—
    For admixture _____ 64.5
    First wash _____ 37
    Second wash _____ 37
  Mother liquor—
    Hydrocarbon _____ 115.5
    Carbon tetrachloride _____ 31.5
  First melt—
    Liquid:
      Hydrocarbon _____ 20.5
      Carbon tetrachloride _____ 7
  First wash—
    Liquid:
      Hydrocarbon _____ 12
      Carbon tetrachloride _____ 33
  Second wash—
    Liquid:
      Hydrocarbon _____ 11
      Carbon tetrachloride _____ 42.5
  Final melt—
    Hydrocarbon _____ 2.7
    Liquid _____ 3.3
  Temperature, °F.—
    Initial crystallization _____ −47
    Filtration _____ −106 to −95
    First melt _____ −40
    First wash _____ −14
    Second wash _____ −2
  Ratio—
    Mole ratio of p-xylene in feed stock to
      carbon tetrachloride _____ 1:3.0

Compositions (CCl₄-free basis):
  Mother liquor— Volume percent
    o-Xylene _____ 11.5
    m-Xylene _____ 57.6
    p-Xylene _____ 0.8
    Ethylbenzene _____ 15.6
    Non-aromatics _____ 14.5
      Total _____ 100.0

Solid phase—
    p-Xylene
      First melt _____ 16
      First wash _____ 46
      Second wash _____ 70
      Final melt _____ 96

Recovery:
  Liquid _____ 90
  Feed stock _____ 93
  p-Xylene _____ 72

Results from the foregoing Table V indicate indirect refrigeration may be used. Likewise, the table indicates that a p-xylene content of 0.8 percent in the carbon tetrachloride-free mother-liquor and 96 percent pure p-xylene can be obtained by the process of this invention.

EXAMPLE 5

The separation of this example was conducted similarly to that of Example 2, except that in this example carbon tetrabromide was used in place of carbon tetrachloride.

Table VI, which follows, summarizes the data obtained from this example.

TABLE VI

| Process data: | Volume (cc.) |
|---|---|
| Feed | 36 |
| Carbon tetrabromide | 13.5 |
| Mother liquor— | |
|     Hydrocarbon | 16 |
|     Carbon tetrabromide | 5 |
| First melt— | |
|     Hydrocarbon | 1.1 |
|     Carbon tetrabromide | 1.0 |
| Final melt— | |
|     Hydrocarbon | 2.5 |
|     Carbon tetrabromide | 2.4 |
| Temperature, °F.— | |
|     Filtration | −20 |
| Ratio— | |
|     Mole ratio of p-xylene to carbon tetrabromide | 1:2.9 |

| Compositions ($CBr_4$-free basis): | |
|---|---|
| Mother liquor— | Volume percent |
|     o-Xylene | 7.5 |
|     m-Xylene | 55.1 |
|     p-Xylene | 1.6 |
|     Ethylbenzene | 17.7 |
|     Non-aromatics | 18.1 |
|     Total | 100.0 |
| First melt— | |
|     p-Xylene | 31 |
| Final melt— | |
|     p-Xylene | 82 |

Results from Table VI indicate that carbon tetrabromide can also be used to separate p-xylene from a feed stock containing xylene isomers.

EXAMPLE 6

To a feed stock, similar to that used in Example 1, carbon tetrachloride was added in a ratio of one volume of feed to 0.375 volume of carbon tetrachloride. The carbon tetrachloride and feed were mixed and cooled to −30° F. The mixture was then added to an intermediate point of a column similar to that illustrated in Figure 2. The top of the column was maintained at a temperature of −80° F. and the bottom of the column had a temperature of 23° F. The cooled mixture was added to the column at a rate that permitted the solid formed in the column to fall to the bottom of the column and at a rate that substantially lowered the p-xylene content in the stream passing out the top of the column over that of the incoming feed. The molecular compound of p-xylene and carbon tetrachloride was melted and withdrawn from the bottom of the column. The withdrawal rate of the melted solid from the bottom of the column was conducted at a rate that permitted a melted solid phase to exist above the melting zone, so that the downcoming solid could be washed by the melted solid substantially free of mother liquor. Analysis of the melted solid, after the carbon tetrachloride had been distilled from it, showed that p-xylene recovered had a purity of 95 percent.

EXAMPLE 7

A 50 cc. sample of a 350–415° F. fraction of a catalytically reformed naphtha bottoms from a catalytic reformer containing 17 weight percent durene, and 15 cc. of dibromodichloromethane were poured into the Dewar flask, described in Example 1. The flask was cooled by being immersed in liquid nitrogen. Upon cooling, a molecular compound, containing equimolar parts of durene and dibromodichloromethane, was formed and separated.

Process data and analysis of materials formed in the process steps follow in Table VII:

TABLE VII

| Process data: | Volume (cc.) |
|---|---|
| Feed | 50 |
| Dibromodichloromethane | 15 |
| Mother-liquor | 35 |
| First melt | 11.5 |
| Final melt | 7.2 |
| Temperature, °F.— | |
|     Initial crystallization | 36 |
|     Filtration | −40 |
| Ratio— | |
|     Mole ratio of durene in feed to dibromodichloromethane | 1:2.6 |

| Composition ($CBr_2Cl_2$-free basis): | Percent durene |
|---|---|
| Mother liquor | less than 1 |
| Melted crystals (from final melt) | 77 |

The foregoing example and table illustrate how durene can be separated effectively from a normally liquid hydrocarbon mixture mixed with dibromodichloromethane. Normal solubility of durene in mother-liquor at −40° F. is 5.5 percent.

EXAMPLE 8

A 100 cc. sample of a 320–360° F. fraction of a catalytically reformed naphtha bottoms from a catalytic reformer containing 37 volume percent pseudocumene and 38 cc. of carbon tetrachloride were poured into the Dewar flask described in Example 1. The flask was cooled according to the procedure given in Example 1. Upon cooling, a solid molecular compound, containing pseudocumene and carbon tetrachloride, formed and was separated from the mother liquor similar to the method given in Example 1.

Process data and analysis of materials formed in the proces steps are given in Table VIII, which follows:

TABLE VIII

| Process data: | Volume (cc.) |
|---|---|
| Feed | 100 |
| Carbon tetrachloride | 38 |
| Mother-liquor— | |
|     Hydrocarbon | 72 |
|     Carbon tetrachloride | 23 |
| Melted crystals— | |
|     Hydrocarbon | 18 |
|     Carbon tetrachloride | 10 |
| Temperature, °F.— | |
|     Initial crystallization | −88 |
|     Filtration | −108 to −90 |
| Ratio— | |
|     Mole ratio of pseudocumene in feed to carbon tetrachloride | 1:1.46 |

| Composition ($CCl_4$-free basis): | Percent pseudocumene |
|---|---|
| Mother liquor | 28 |
| Melted crystals | 72 |

| Recovery: | Percent |
|---|---|
| Liquid | 98 |
| Hydrocarbon | 90 |
| Pseudocumene | 90 |

The foregoing example and table illustrate how pseudocumene may be separated from a hydrocarbon fraction pursuant to this invention. However, complete separation of the pseudocumene was not accomplished because of the low carbon tetrachloride-pseudocumene ratio, and by increasing this ratio the separation and recovery of pseudocumene may be increased.

This amount of tetrahalogenated methane to be added to a hydrocarbon liquid to achieve most efficient separation of p-dimethyl benzenes may be determined, for example, by measuring the effect of tetrahalogenated methane on the crystallization temperature of a hydrocarbon mixture corresponding in composition to the feed free of polymethyl benzene hydrocarbons having at least one pair of methyl groups in para-relationship. A series of initial solidification temperature determinations was conducted to determine the optimum amount of carbon tetrachloride required to separate the maximum quantity of p-xylene from $C_8$ hydrocarbon mixtures. A number of mixtures of $C_8$ hydrocarbon mixtures were prepared by blending a hydrocarbon liquid containing:

| | Volume percent |
|---|---|
| o-Xylene | 11.6 |
| m-Xylene | 57.6 |
| p-Xylene | 0.7 |
| Ethylbenzene | 15.6 |
| Non-aromatics | 14.5 | with varying amounts of para-xylene and carbon tetrachloride.

Figures 6, 7, 8, 9 and 10 are graphical representations of the results obtained. The lines on the graphs show the temperature at which a solid phase first appeared when the mixtures of varying composition were cooled. The para-xylene content is expressed in volume per cent of the hydrocarbon portion of the mixture subjected to cooling.

Figure 6:
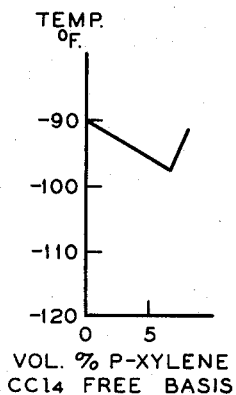

In the experiments summarized in Figure 6, the quantity of carbon tetrachloride added to the hydrocarbon was the molecular equivalent of the para-xylene content of the hydrocarbon. When compositions containing less than about 6.5% of para-xylene were cooled, the first solid phase formed was meta-xylene and the temperature at which the first formation of a solid phase occurred was reduced as the para-xylene content rose from 0.7 volume percent to 6.5 volume percent based on the hydrocarbon portion of the mixture.

Figure 7:
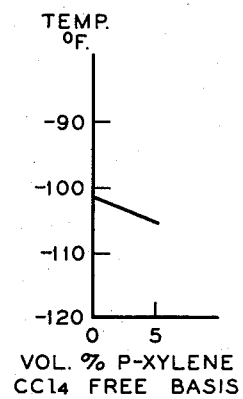

Figure 7 illustrates the effect of carbon tetrachloride present in amounts in excess of the molecular equivalent of the para-xylene in the hydrocarbon portion of the mixture on the temperature of first solid formation. In the determinations summarized in Figure 7, the mixtures subjected to cooling content a quantity of carbon tetrachloride which was the molecular equivalent of the para-xylene content of the mixture plus additional tetrachloride amounting to 16% of the volume of the total hydrocarbon content of the mixture. The first solid phase appearing in the solutions shown in Figure 7 was meta-xylene. Figure 7 illustrates how carbon tetrachloride acts as a diluent toward meta-xylene and reduces the temperature at which it crystallizes.

Figure 8:
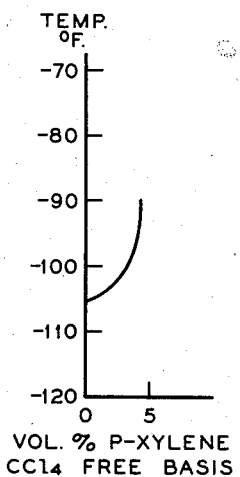

The solutions, cooled to obtain the data illustrated in Figure 8, contain carbon tetrachloride in amount which was the molecular equivalent of the para-xylene contained in the hydrocarbon plus additional carbon tetrachloride amounting to 19 volume percent of the total hydrocarbon contained in the mixtures. As the mixtures illustrated in Figure 8 are cooled, the first solid formed is the molecular compound para-xylene·$CCl_4$.

Figure 9:
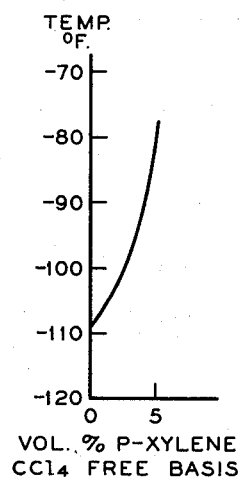

The solutions cooled to obtain the data illustrated in Figure 9 contained carbon tetrachloride in an amount which was the molecular equivalent of the para-xylene contained in the hydrocarbon portion of the mixtures plus a further quantity of carbon tetrachloride amounting to 28 volume percent of the total hydrocarbon content of the mixture. The first solid phase appearing when the compositions illustrated in Figure 9 were cooled was the molecular compound para-xylene·$CCl_4$.

Figure 10:
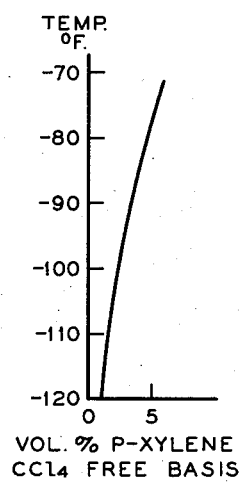

The solutions cooled to obtain the data illustrated in Figure 10 contained carbon tetrachloride in an amount which was the molecular equivalent of the para-xylene contained in the hydrocarbon portion of the mixtures plus an additional quantity of carbon tetrachloride amounting to 40 volume percent of the total hydrocarbon contained in the mixture. Again, the first solid phase when the compositions were cooled was the molecular compound para-xylene·$CCl_4$. It will be noted, however, by comparing Figures 9 and 10 that little advantage was obtained by increasing the total carbon tetrachloride content of the mixtures from the level employed in experiments on which Figure 9 is based to that of the experiments on which Figure 10 is based.

The quantity of excess tetrahalogenated methane required to assure maximum deposition of the molecular compound may be different for other hydrocarbon mixtures. For example, when more than about 60 percent of a xylene isomer feed is m-xylene, prevention of the crystallization of m-xylene previous to the formation of the solid compound p-xylene·$CCl_4$ is an important factor. In order to prevent this crystallization of m-xylene before the molecular compound crystallizes from such mixtures, larger amounts of tetrahalogenated methane are required than in feed stocks containing lesser quantities of m-xylene. The amount of tetrahalogenated methane, however, should not be so great as to cause crystallization or solidification of the tetrahalogenated methane itself previous to the solidification of the molecular compound. Optimum quantities of tetrahalogenated methane can be determined for any hydrocarbon mixture by simple experiment or by reference to phase diagrams corresponding to Figure 3.

As indicated in the above examples, cooling may be accomplished by direct or indirect heat-exchange. Cooling by indirect heat-exchange may be accomplished, for example, by contacting the feed stock and carbon tetrachloride with cooling coils. Cooling by direct heat-exchange may be accomplished by addition of solid carbon dioxide or other similar materials to the mixture of feed and carbon tetrachloride to effect cooling of said mixture by evaporation of the added material.

By the process of this invention, substantially complete p-xylene recovery may be effected from either a binary mixture of p-xylene and m-xylene or from a hydrocarbon mixture containing xylene isomers. It may be noted that the amount of tetrahalogenated methane desirable for maximum separation will vary with the specific tetrahalogenated methane employed as well as with the composition of the feed. For example, when carbon tetrachloride is used to separate a binary mixture of p-xylene and m-xylene, the amount of carbon tetrachloride added to the mixture is desirably one mole of carbon tetrachloride per mole of p-xylene in the mixture plus 1.3 moles of carbon tetrachloride per mole of m-xylene in the mixture; or, expressed on a volume basis, the amount of carbon tetrachloride added is desirably 0.78 volume per volume of p-xylene plus 1.02 volumes of carbon tetrachloride per volume of m-xylene. If a heavier tetrahalogenated methane is employed, for example, carbon tetrabromide, less molar amounts suffice.

The feed stock and tetrahalogenated methane should be cooled sufficiently to cause separation of a solid molecular compound phase and a mother-liquor phase, but the temperature to which the mixture of tetrahalogenated methane and feed is cooled should be above that at which eutectic formation with other components of the feed occurs.

When it is desired to separate p-xylene, o-xylene, and m-xylene in substantially pure form from a mixture containing xylene isomers, the process of this invention may be conducted by first fractionally distilling the hydrocarbon mixture containing the xylene isomers to separate o-xylene as the bottoms product and then subjecting the distillation overhead containing p-xylene and m-xylene of said process to fractional crystallization in the presence of a tetrahalogenated methane in order to separate p-xylene from the mixture and then separating the solvent from the mother-liquor and cooling the mother-liquor above a temperature at which eutectic composition occurs to crystallize m-xylene. The fractional crystallization may be conducted first in order to separate p-xylene from the hydrocarbon feed and then followed by fractional distillation to separate the o-xylene from the p-xylene-free hydrocarbon mixture before or after m-xylene is separated by crystallization. Thus, by utilizing the process of this invention, substantially pure p-xylene, o-xylene, and m-xylene are obtained.

In order to increase the ultimate yield of the methyl-substituted benzene compounds from a feed stock containing these benzene compounds, the mother-liquor, after removal of the tetrahalogenated methane, may be subjected to an isomerization treatment and then recycled and used as the feed stock. After the isomerization step, for example, the relative amounts of o-xylene, m-xylene and p-xylene in a xylene isomer feed are in an approximate mole ratio of 22:59:19.

As indicated in the above examples, the solid molecular compound may be washed and partially melted to remove any entrained mother-liquor and recrystallized to cause a further separation of the entrained mother-liquor and the crystals. Materials especially suitable for washing the solid phase are: the tetrahalogenated methane forming a component of the compound, and mixtures of tetrahalogenated methane with 1 to 10% of the para-dimethyl benzene being separated. If desired, other wash liquids such as light hydrocarbons, e. g., pentane, low molecular weight alcohols, and the like may be employed.

Sufficient time should be allowed during the crystallization step to permit adequate crystal growth of the solid molecular compound in order to facilitate separation of the solid from the remaining liquid phase. This separation step may be accomplished by filtration, settling and decanting, or by centrifuging.

The normally liquid hydrocarbon mixture containing para-dimethyl benzene hydrocarbons may be derived from petroleum, e. g., catalytically reformed naphtha, shale oil, tar sand, coal tar, and synthesis processes. When p-xylene and the xylene isomers are to be separated by the process of this invention, the hydrocarbon mixture should boil in the range of $C_7$ to $C_9$ hydrocarbons, which is about 160° F. to about 365° F. for a petroleum fraction. When durene is to be separated by the process of this invention, the hydrocarbon fraction should boil in the range of $C_9$ to $C_{11}$ hydrocarbons, which is about 350° F. to about 415° F. for a petroleum fraction. A narrower cut of a coal-tar fraction may be used because of less interference of paraffins, etc. on the boiling temperature.

It is not intended that this invention be limited to the examples given above for the sake of illustration, but rather to extend it to such modifications within the skill of the art as are within the scope of the appended claims.

I claim:

1. A process for separating the polymethyl benzene hydrocarbons having no nuclear substituents other than methyl groups and having at least one pair of methyl groups in para-relationship which are present therein from a hydrocarbon liquid comprising at least one of said polymethyl benzene hydrocarbons and at least one position isomer thereof which comprises adding a tetrahalogenated methane in which each of the halogen atoms has an atomic weight at least equal to that of chlorine to the hydrocarbon liquid, said tetrahalogenated methane being added in an amount sufficient to form a solid molecular compound with said polymethyl benzene hydrocarbons when the resultant mixture is cooled, cooling the resultant mixture to a temperature sufficient to form a solid phase consisting essentially of a material selected from the group consisting of said molecular compound, mixtures of said compound and said polymethyl benzene hydrocarbons and mixtures of said compound and said tetrahalogenated methane, and a mother-liquor phase comprising the other hydrocarbons including said position isomers and separating the phases.

2. A process for separating the polymethyl benzene hydrocarbons having no nuclear substituents other than methyl groups and having at least one pair of methyl groups in para-relationship which are present therein from a predominantly aromatic hydrocarbon liquid comprising at least one of said polymethyl benzene hydrocarbons and at least one position isomer thereof which comprises adding a tetrahalogenated methane in which each of the halogen atoms has an atomic weight at least equal to that of chlorine to the hydrocarbon liquid, said tetrahalogenated methane being added in an amount sufficient to form a solid molecular compound with said polymethyl benzene hydrocarbons when the mixture is cooled, cooling the resultant mixture to a temperature sufficient to cause formation of a solid phase containing a minor proportion of the aromatic hydrocarbon and said solid molecular compound and a mother-liquor phase comprising the other hydrocarbons including said position isomers and separating the phases.

3. A process for separating the polymethyl benzene hydrocarbons having no nuclear substituents other than methyl groups and having at least one pair of methyl groups in para-relationship which are present therein from a hydrocarbon liquid comprising at least one of said polymethyl benzene hydrocarbons and at least one position isomer thereof which comprises adding a tetrahalogenated methane in which each of the halogen atoms has an atomic weight at least equal to that of chlorine to the hydrocarbon liquid, said tetrahalogenated methane being added in an amount sufficient to form a solid molecular compound with said polymethyl benzene hydrocarbons when the resultant mixture is cooled, and cooling the resultant mixture to a temperature sufficient to cause formation of a solid molecular compound of said polymethyl benzene and tetrahalogenated methane.

4. A process as disclosed in claim 3, wherein said benzene polymethyl hydrocarbon having at least one pair of methyl groups in para-relationship is durene.

5. A process as disclosed in claim 3, wherein said benzene polymethyl hydrocarbon having at least one pair of methyl groups in para-relationship is pseudocumene.

6. A process as disclosed in claim 3, wherein said tetrahalogenated methane is carbon tetrachloride.

7. A process as disclosed in claim 3, wherein said tetrahalogenated methane is carbon tetrabromide.

8. A process as disclosed in claim 3, wherein said tetrahalogenated methane is dibromodichloromethane.

9. A fractional crystallization process for separating the polymethyl benzene hydrocarbons having no nuclear substituents other than methyl groups and having at least one pair of methyl groups in para-relationship which are present therein from normally liquid mixtures containing at least one of said polymethyl benzene hydrocarbons and other hydrocarbon compounds including at least one position isomer of one polymethyl benzene hydrocarbon present comprising adding a tetrahalogenated methane in which each of the halogen atoms has an atomic weight at least equal to that of chlorine to said hydrocarbon mixture, said tetrahalogenated methane being added in an amount sufficient to form a molecular compound with said polymethyl benzene hydrocarbons when the resultant mixture is cooled, cooling the resultant mixture to a temperature to form a solid phase consisting essentially of a material selected from the group consisting of said molecular compound, mixtures of said compound and said polymethyl benzene hydrocarbons and mixtures of said compound and said tetrahalogenated methane and a mother-liquor phase consisting primarily of said other hydrocarbons including said position isomer and tetrahalogenated methane, separating said phases, and recovering said polymethyl benzene hydrocarbons from said solid phase.

10. A process for recovering the high-purity polymethyl benzene hydrocarbons having no nuclear substituents other than methyl groups and having at least one pair of methyl groups in para-relationship which are present therein from a normally liquid hydrocarbon mixture containing at least one of said polymethyl benzene hydrocarbons and other hydrocarbon compounds including at least one position isomer of one polymethyl benzene hydrocarbon present comprising adding to said mixture at least one mole of tetra-halogenated methane in which each of the halogen atoms has an atomic weight at least equal to that of chlorine per mole of said polymethyl benzene hydrocarbons in said hydrocarbon mixture, cooling the resultant mixture to a temperature sufficient to form a solid phase consisting essentially of a molecular compound of said polymethyl benzene hydrocarbons and tetrahalogenated methane and a mother-liquor phase containing said other hydrocarbon compounds including said position isomer and tetrahalogenated methane, separating said phases, and recovering said polymethyl benzene hydrocarbons from said solid phase.

11. A process as disclosed in claim 10, wherein the normally liquid hydrocarbon mixture is a $C_9$ fraction.

12. A process as disclosed in claim 10, wherein the normally liquid hydrocarbon mixture is a $C_{10}$ fraction.

13. A process as disclosed in claim 10, wherein the normally liquid hydrocarbon mixture is a $C_{11}$ fraction.

14. A process as disclosed in claim 10, wherein the normally liquid hydrocarbon mixture is a predominantly aromatic liquid boiling in the range from about 350° F. to about 415° F.

15. A process as disclosed in claim 10, wherein the amount of said tetrahalogenated methane is greater than one mole of said tetrahalogenated methane per mole of said polymethyl benzene hydrocarbons having at least one pair of methyl groups in para-relationship but insufficient to cause said tetrahalogenated methane to solidify before said molecular compound is produced upon cooling said hydrocarbon mixture and said tetrahalogenated methane.

16. A continuous process for separating the polymethyl benzene hydrocarbons having no substituents other than methyl groups and having at least one pair of methyl groups in para-relationship which are present therein from a mixture of at least one of said polymethyl benzene hydrocarbons with other hydrocarbon compounds including at least one position isomer of said polymethyl benzene hydrocarbons, which comprises passing said mixture and tetrahalogenated methane in which each of the halogen atoms has an atomic weight at least equal to that of chlorine into a separation zone at an intermediate point thereof, said tetrahalogenated methane being employed in an amount sufficient to form a molecular compound with said polymethyl benzene hydrocarbons when the resultant mixture is cooled, maintaining the upper portion of the separation zone at a reduced temperature sufficient to form a solid phase consisting essentially of said molecular compound of polymethyl benzene hydrocarbons and tetrahalogenated methane and the lower portion of said separation zone at an elevated temperature sufficient to melt said solid phase, maintaining in said lower portion a body of melted solid phase in free fluid intercommunication with the hydrocarbon mixture and mother-liquor in the upper portion of said separation zone, withdrawing melted solid from the lower portion of said separation zone at a rate adapted to maintain a relatively constant volume of the melted solid body in the separation zone, and withdrawing the mother-liquor from the upper portion of the separation zone.

17. A fractional crystallization process for separating the polymethyl benzene hydrocarbons having no substituents other than methyl groups and having at least one pair of methyl groups in para-relationship which are present therein from a normally liquid hydrocarbon mixture containing at least one of said polymethyl benzene hydrocarbons and other hydrocarbon compounds including at least one position isomer of said polymethyl benzene hydrocarbons comprising adding tetrahalogenated methane in which each of the halogen atoms has an atomic weight at least equal to that of chlorine to said hydrocarbon mixture, said tetrahalogenated methane being added in an amount sufficient to form a molecular compound with said polymethyl benzene hydrocarbons when the resultant mixture is cooled, cooling said hydrocarbon mixture and said tetrahalogenated methane sufficiently to form a solid phase consisting essentially of said molecular compound of polymethyl benzene hydrocarbons and tetrahalogenated methane and a mother-liquor phase containing other hydrocarbon compounds and tetrahalogenated methane, separating said phases, washing said solid phase with an organic wash liquid, and recovering said polymethyl benzene hydrocarbons from the washed solid phase.

18. A process is disclosed in claim 17, wherein said organic wash liquid is said tetrahalogenated methane.

19. A process as disclosed in claim 17, wherein the organic wash liquid consists of a mixture of a major proportion of said tetrahalogenated methane and a minor proportion of said polymethyl benzene.

20. A process for separating durene from isodurene comprising adding dibromodichloromethane to a hydrocarbon mixture containing durene and isodurene, said dibromodichloromethane being added in an amount sufficient to form a solid molecular compound with said durene when the resultant mixture is cooled, cooling said dibromodichloromethane and said hydrocarbon mixture to form a solid phase consisting essentially of said molecular compound of durene and dibromodichloromethane and a mother-liquor phase containing said isodurene and dibromodichloromethane, and separating said phases.

21. A process for separating the polymethyl benzene hydrocarbons having no nuclear substituents other than the methyl groups and having at least one pair of methyl groups in para-relationship which are present therein from a mixture of at least one of said polymethyl benzene hydrocarbons and other hydrocarbons including at least one position isomer of said polymethyl benzene hydrocarbons which comprises adding tetrahalogenated methane containing only halogen atoms of the group consisting of chlorine and bromine atoms to said mixture, said tetrahalogenated methane being added in an amount sufficient to form a molecular compound with said polymethyl benzene hydrocarbons when the resultant mixture is cooled, cooling the resultant mixture to a temperature sufficient to form a solid phase consisting essentially of said molecular compound of polymethyl benzene hydrocarbons and tetrahalogenated methane and a mother-liquor phase containing said other hydrocarbons including said position isomer and tetrahalogenated methane, and separating said phases.

22. A process for recovering para-xylene from a xylene concentrate which comprises adding a substantial quantity of carbon tetrachloride to the concentrate and cooling the resultant mixture to a temperature below about 22° F. to cause separation of two phases, a para-xylene rich solid phase containing para-xylene and carbon tetrachloride and a liquid phase lean in para-xylene.

23. A process for recovering para-xylene from a xylene rich fraction of catalytically reformed naphtha which comprises adding carbon tetrachloride to the xylene fraction, cooling the resultant mixture to a temperature lower than about 22° F. to cause the formation of two phases, a para-xylene rich solid phase containing carbon tetrachloride and para-xylene and a liquid phase lean in para-xylene, and separating the phases.

24. A process for recovering para-xylene from a xylene concentrate which comprises adding to the xylene concentrate at least one mol of carbon tetrachloride per mol of para-xylene contained therein, cooling the resulting mixture to cause separation of two phases, a para-xylene rich solid phase containing para-xylene and carbon tetrachloride and a liquid phase lean in para-xylene, separating the phases, melting the solid phase and fractionally distilling it to separate carbon tetrachloride and para-xylene.

25. A process for recovering para-xylene from a xylene concentrate which comprises adding to the concentrate at least one mol of carbon tetrachloride per mol of para-xylene contained therein, cooling the resultant mixture to a temperature in the range from −70 to −90° F. to cause separation of two phases, a para-xylene rich solid phase containing para-xylene and carbon tetrachloride and a liquid phase lean in para-xylene, separating the phases, melting the solid phase and fractionally distilling it to separate carbon tetrachloride and para-xylene.

26. A process for recovering para-xylene from a xylene concentrate which comprises adding to the xylene concentrate at least one mol of carbon tetrachloride per mol of para-xylene contained therein, cooling the resultant mixture to cause separation of a para-xylene rich solid phase containing para-xylene and carbon tetrachloride therefrom, separating the solid phase from the cooled mixture, melting the solid phase and fractionally distilling it to separate carbon tetrachloride and a hydrocarbon fraction having a para-xylene content substantially greater than that of the xylene concentrate.

27. A process for recovering para-xylene from a xylene concentrate which comprises adding to the concentrate at least one mol of carbon tetrachloride per mol of para-xylene contained therein, cooling the resultant mixture to cause separation of two phases, a para-xylene rich solid phase containing para-xylene and carbon tetrachloride and a liquid phase lean in para-xylene, centrifugally filtering the cooled mixture to separate the solid phase as a filter cake, slurrying the filter cake with carbon tetrachloride, centrifugally filtering the slurry to separate a filter cake consisting essentially of para-xylene and carbon tetrachloride, melting the latter filter cake and fractionally distilling it to separate carbon tetrachloride and para-xylene.

28. A process for recovering para-xylene from a xylene-rich fraction of catalytically reformed naphtha which comprises adding to the fraction at least one mol of carbon tetrachloride per mol of para-xylene contained therein, cooling the resultant mixture in a crystallization zone to cause separation of two phases, a para-xylene in rich solid phase containing para-xylene and carbon tetrachloride and mother liquor lean in para-xylene, filtering the cooled mixture to separate the solid phase, slurring the solid phase with carbon tetrachloride in a washing zone at a temperature above the temperature of the crystallization zone to cause partial melting of the solid phase, filtering the slurry produced in the washing zone to separate a filter cake consisting predominantly of carbon tetrachloride and para-xylene and a filtrate containing carbon tetrachloride and small amounts of para-xylene, returning the filtrate to the crystallization zone together with further quantities of said xylene-rich fraction, melting the solid phase and fractionally distilling it to separate carbon tetrachloride and para-xylene, distilling the mother liquor to separate carbon tetrachloride from the unsolidified portion of the xylene fraction, and subsequently returning the carbon tetrachloride separated in the fractional distillation of the solid phase and of the mother liquor to the washing zone to treat the solid phase subsequently produced in the crystallization zone.

29. A process for separating individual xylene isomers from xylene concentrates containing substantial amounts of meta- and para-xylene which comprises adding to the concentrate at least one mol of carbon tetrachloride per mol of para-xylene contained therein, cooling the resultant mixture to cause separation of two phases, a para-xylene rich solid phase consisting predominantly of para-xylene and carbon tetrachloride and a liquid phase lean in para-xylene, separating the phases, melting the solid phase and frictionally distilling it to separate carbon tetrachloride and a hydrocarbon fraction rich in para-xylene, frictionally distilling the liquid phase to separate carbon tetrachloride and the unsolidified portion of the xylene concentrate, and cooling the unsolidified portion of the xylene concentrate to separate a solid phase consisting essentially of meta-xylene and a liquid phase, and separating the phases.

30. A process for separating individual isomers from xylene concentrates containing substantial proportions of ortho-, meta- and para-xylene which comprises fractionally distilling the xylene concentrate to separate an overhead fraction containing meta-xylene and para-xylene and lean in ortho-xylene and a kettle product rich in ortho-xylene, adding to the overhead fraction at least one mol of carbon tetrachloride per mol of para-xylene therein, cooling the resultant mixture to cause separation of two phases, a para-xylene rich solid phase consisting predominantly of para-xylene and carbon tetrachloride and a liquid phase lean in para-xylene, separating the phases, melting the solid phase and fractionally distilling it to separate carbon tetrachloride and a hydrocarbon fraction rich in para-xylene, fractionally distilling the liquid phase to separate carbon tetrachloride and the unsolidified portion of the xylene concentrate, and cooling the unsolidified portion of the xylene concentrate to separate a solid phase consisting essentially of meta-xylene and a liquid phase, and separating the phases.

31. A process for recovering para-xylene from a mixture containing para-xylene and meta-xylene which comprises adding carbon tetrachloride to the mixture in an amount sufficient to form a solid phase complex of para-xylene and carbon tetrachloride when the resulting admixture is cooled and cooling the admixture to cause separation of two phases, a liquid phase lean in para-xylene and a para-xylene rich solid phase consisting essentially of a material selected from the group consisting of said complex, mixtures of said complex and para-xylene, and mixtures of said complex and carbontetrachloride.

32. The method of separating components of a mixture containing para-xylene and meta-xylene which comprises forming a liquid admixture of said mixture with an amount of a tetrahalomethane such that the composition of the resulting admixture will fall within that region, on a temperature-composition, liquid-solid phase diagram of the resulting system, in which a complex of said tetrahalomethane and only para-xylene can exist in the solid phase, lowering the temperature of said admixture to a temperature below the highest temperature at which a solid phase is obtained but above that at which the composition of the resulting liquid phase will represent an eutectic composition, whereby a solid phase complex of said tetrahalomethane and only one of said components is obtained, and separating the resulting solid phase complex.

References Cited in the file of this patent

UNITED STATES PATENTS

| | | |
|---|---|---|
| 1,940,065 | Spannagel et al. | Dec. 19, 1933 |
| 2,435,792 | McArdle et al. | May 17, 1949 |
| 2,540,977 | Arnold | Feb. 6, 1951 |
| 2,627,513 | Arey | Feb. 3, 1953 |

OTHER REFERENCES

International Critical Tables, vol. IV, 1st ed. (1928), page 98.

Chem. Abstracts, 42, 1902e (1948).